Figure 1:
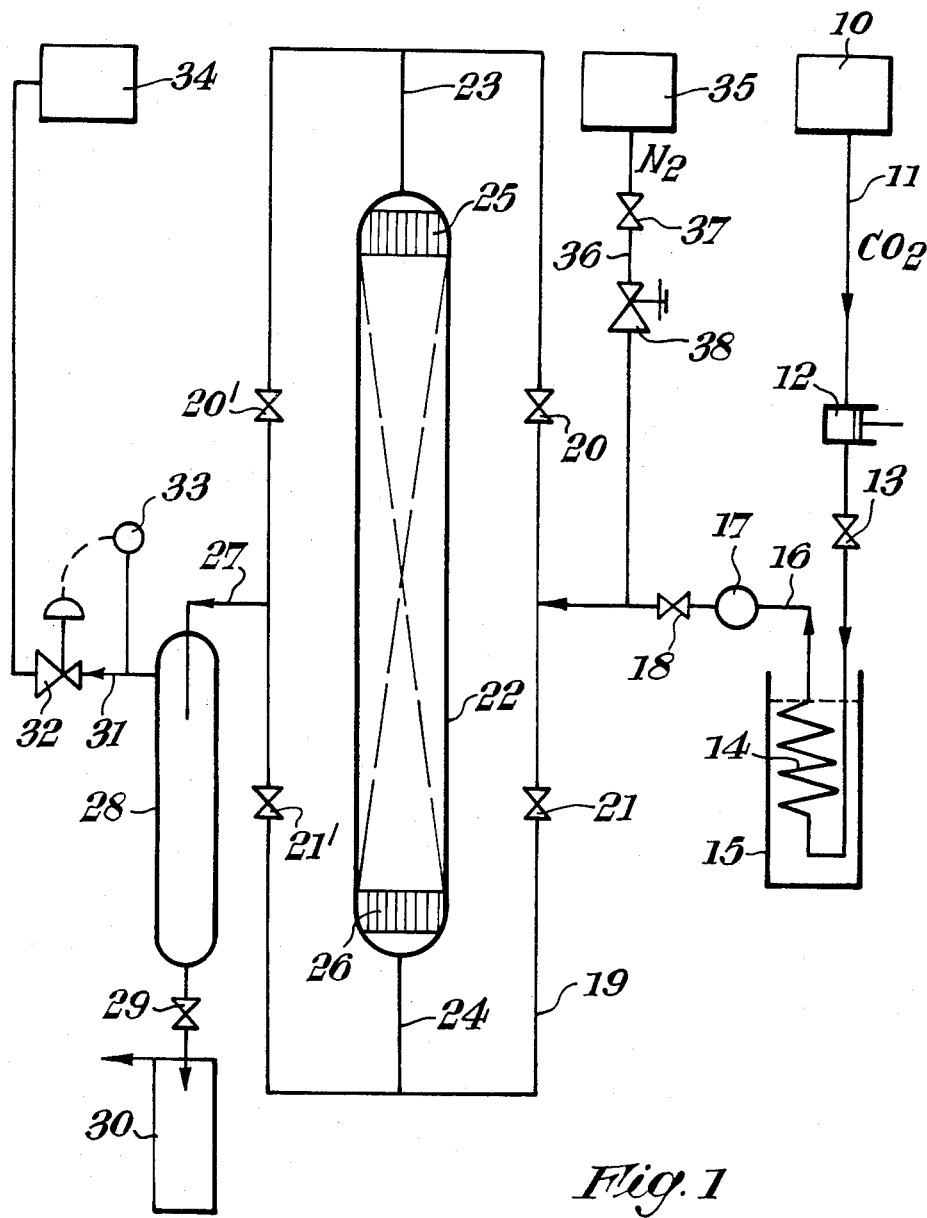

United States Patent [19]

Panzner et al.

[11] Patent Number: 4,554,170

[45] Date of Patent: Nov. 19, 1985

[54] EXTRACTION OF PLANT MATERIAL BY USING CARBON DIOXIDE

[75] Inventors: Frank Panzner; Brian R. Evans, both of Tenbury Wells, England

[73] Assignee: Hop Developments Limited, Worcestershire, England

[21] Appl. No.: 490,676

[22] Filed: May 2, 1983

[30] Foreign Application Priority Data

May 6, 1982 [GB] United Kingdom ................ 8213136
Jun. 22, 1982 [GB] United Kingdom ................ 8217980

[51] Int. Cl.$^4$ ...................... A23L 1/222; A61K 35/78
[52] U.S. Cl. .................................. 426/651; 424/195.1
[58] Field of Search .................. 260/236.5; 424/195.1; 426/651

[56] References Cited

FOREIGN PATENT DOCUMENTS 1310257 7/1970 United Kingdom .
1388581 6/1972 United Kingdom .
1557123 4/1977 United Kingdom .
2026539 6/1979 United Kingdom .

*Primary Examiner*—Elbert L. Roberts
*Assistant Examiner*—John W. Rollins, Jr.
*Attorney, Agent, or Firm*—Albert L. Jeffers; Stephen T. Belsheim

[57] ABSTRACT

Plant material (for example, milled hop pellets) is placed in a pressure vessel and carbon dioxide is passed through the vessel in order to extract essential oil and resin components. Said passage is stopped after a predetermined period of time and inert gas(es) is/are used to displace said carbon dioxide and the extract(s) from said vessel to another location.

If liquid carbon dioxide is used, it is displaced to an evaporator in which the extract is deposited, carbon dioxide being gasified. If supercritical carbon dioxide is used, it is displaced to a separator.

Alternatively, the plant material may be steeped in liquid carbon dioxide which, after the steeping period, is displaced as aforesaid.

The gases (carbon dioxide and inert) may be vented to atmosphere or recovered for re-use.

Extraction using liquid carbon dioxide is isobaric whereas using supercritical carbon dioxide, the pressure in the pressure vessel is higher than in the separator.

9 Claims, 2 Drawing Figures

EXTRACTION OF PLANT MATERIAL BY USING CARBON DIOXIDE

This invention relates to extraction of plant material by using liquid or supercritical carbon dioxide.

Plant materials have been extracted, for many years, by the use of certain solvents (such, for example, as petroleum ether and benzene) in order to remove not only most of the perfume or flavour materials but also waxes, colouring matter and resinous materials. The extracts obtained have all had traces of the organic solvents used.

In the field of beer brewing, it has become known, comparatively recently, to extract hops with liquid carbon dioxide under carefully controlled conditions (Journal of the Institute of Brewing, dated September-/October 1980, volume 86, pages 234–241 and also European Patent Application EP No. 0 020 086 A1, published 10th Dec. 1980). It has been found, however, that difficulties are encountered when using apparatus which is exemplified by that illustrated in FIG. 1 of the paper in said Journal and in FIG. 2 of said published Application, as explained below, when partial extraction is attempted.

Milled hops are placed in, say, one vertically disposed pressure vessel which is then closed and connected to a supply of liquid carbon dioxide. The hops are extracted by passage of the carbon dioxide through the column. It has been found to be desirable to interrupt or stop extraction at a point at which a required percentage of the available essential oils or resin components has been extracted; at the time of said interruption or stoppage, the pressure vessel and the filter and the ancillary piping all contain a dilute solution of the extractable components of the milled hops. During decompression of the apparatus, the carbon dioxide will evaporate and this will result in the dissolved components of the extract becoming deposited on the milled hops, on the walls of the pressure vessel, on the filter and on the inner surfaces of said piping.

This deposition is not wanted, firstly, because the dissolved components are expensive and are lost once deposited and because loss thereof is obviously undesirable and, secondly, because the deposited dissolved components take the form of a sticky, viscous substance having a soft, putty-like consistency. The deposition of said substance on the walls of the pressure vessel, the piping and the filter is bad enough and necessitates extensive cleaning being undertaken but the deposition thereof on the milled hops makes said hops difficult to deal with; not only have the partly extracted milled hops to be physically removed from the pressure vessel but also said hops must be returned to the brewer (for example, in the form of pellets).

Of course, hops can be extracted by steeping them in the liquid carbon dioxide; in this method, there is no passage of the carbon dioxide through the hops in the way that there is passage thereof as described in the second (next but one) preceding paragraph.

Accordingly, in its broadest aspect, the present invention consists in a method of extracting a plant material in order to obtain at least fractions of its essential oil and resin components, said method comprising the following steps, namely, (a) admixing carbon dioxide in either the liquid or the supercritical state thereof with plant material in a pressure vessel for a period of time in order to effect said extraction;

(b) displacing said carbon dioxide with an inert gas which remains in the gas phase under the extraction conditions; and (c) venting said inert gas from said pressure vessel.

Said inert gas may be one gas (for example, nitrogen) or it may be a mixture of inert gases. Nitrogen, however, is the preferred inert gas because it is generally available. Obviously, the pressure of the inert gas must be higher than that of the carbon dioxide in the extractor.

Said method may be carried into effect by (a) passing said carbon dioxide through said pressure vessel in which said plant material has been packed;

(b) stopping said passage of carbon dioxide at the end of said period of time;

(c) pumping said inert gas into said pressure vessel until all or substantially all of said carbon dioxide has been displaced; and (d) venting said inert gas from said pressure vessel.

Alternatively, when the plant material is steeped in said pressure vessel with said carbon dioxide, the liquid extracts said components during said period of time, at the end of which the carbon dioxide is displaced by said inert gas and, after said displacement, the inert gas is vented from said pressure vessel.

Said inert gas, after the preceding steps have been carried out, can be vented to any desired location (for example, a storage tank from which the inert gas could be drawn for re-use) or can be vented to atmosphere.

Figure 2:
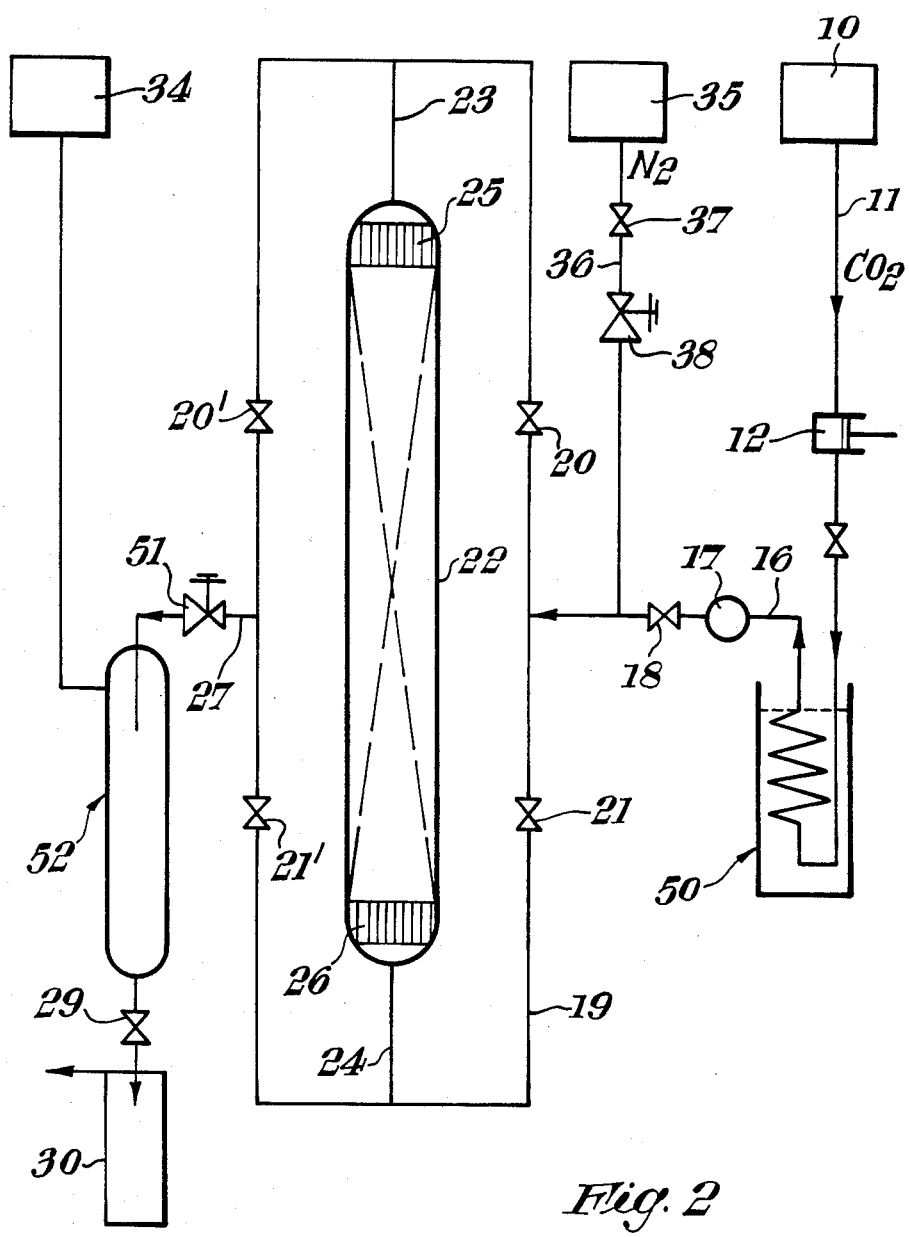

Two embodiments of apparatus, given purely by way of example, suitable for carrying out the method according to the present invention will now be described with reference to the accompanying diagrammatic drawings, in which:

FIG. 1 is a flow diagram showing the principal components used in the extraction of plant material with liquid carbon dioxide; and FIG. 2 is a flow diagram showing the principal components used in the extraction of plant material with carbon dioxide in its supercritical state.

In FIG. 1, there is illustrated a supply 10 of liquid $CO_2$ which is drawn through piping 11 by a pump 12 and is pumped thereby through a valve 13 to one end of a coil 14 which is accommodated in a constant temperature unit 15 which may be of known kind. The function of the unit 15 is, as is well known, to control the temperature of the $CO_2$ feed.

Piping 16 is connected to the other end of said coil and also, by way of a flow-measuring device 17 and a valve 18, to branched piping 19. Valves 20, 21 and 20', 21' are connected in said piping 19 which is also connected to the top and to the bottom of a pressure vessel 22 (hereinafter called the extractor column) by piping 23, 24, respectively. The column 22 contains upper and lower filter elements 25, 26, respectively. Said piping 19 is also connected to piping 27 which is connected to an evaporator 28.

It will be noted that the piping 16 is connected to the piping 19 at a location between the pair of the on-off valves 20, 21 and that the piping 27 is connected to the piping 19 at a location between the pair of on-off valves 20', 21'.

The evaporator 28 is connected via a needle valve 29 to a receptacle 30 for the extract. The evaporator is also connected by piping 31 to a flow-control valve 32 which is itself controlled by a pneumatic pressure regulator 33.

The $CO_2$ gas passing through the valve 32 may be either vented to atmosphere (not illustrated) or fed into a liquefaction apparatus of any known kind represented by the block 34.

A supply 35 of an inert gas or of a mixture of inert gases is connected by piping 36 to the tubing 16, at a location downstream of the valve 18, by way of an on-off valve 37 and a pressure-reducing flow controller 38. The flow controller 38 may be of the spring-loaded manually operated type.

It is essential to control the temperature of the extractor column 22 preferably by controlling the temperature of the $CO_2$ feed in the constant temperature unit 15. It is also essential for certain components of the plant described above to be made of material(s) which will not be attacked by the extract; suitable materials are, for example, stainless steel (especially 316L) for the extractor column 22, the evaporator 28 and for the various piping.

The additional equipment necessary for the recycling of $CO_2$ and of the inert gas(es), including any liquefaction apparatus, is not illustrated because, firstly, such equipment does not form any part of the present invention and, secondly, the provision and design of such equipment is well within the competence of an engineer in the chemical processing industry.

All piping and vessels are properly thermally insulated.

The apparatus described above will now be explained by reference to the extraction of hops by passing liquid $CO_2$ through said hops, the inert gas used at the relevant time being nitrogen:

Hop powder of hop pellets but preferably milled hop pellets, are placed in the column 22, and liquid $CO_2$ at a constant temperature is fed either to the top or to the bottom of said column. If the liquid $CO_2$ is to be fed to the top of the column for passage through the material in said column, the valves 20, 21' will be opened and the valves 21, 20' will be closed; also, the valves 13 and 18 will be opened. If said $CO_2$ is to be fed to the bottom of the column 22, the valves 21, 20' will be opened and the valves 20, 21' will be closed, the valves 13 and 18 are also being opened. When the pump 12 is started, the pressure is increased above the saturation vapour pressure by the pump and the liquid $CO_2$ will be caused to pass through the hops and the extracted essential oils and resin components will be deposited in the evaporator 28, gaseous $CO_2$ passing out of said evaporator by way of the piping 31 to atmosphere or the block 34.

At the end of a predetermined period of time, the flow of liquid $CO_2$ will be stopped by closing the valves 13 and 18 and the valve 37 will be opened in order to admit nitrogen via the controller 38 (which has already been adjusted) into the column 22 by way of the top end of the column. Said inert gas will be allowed to flow until all (or substantially all) of the liquid $CO_2$ and the extracted materials have been displaced from the column 22 and the piping 19 into the evaporator 28. The inert gas must be at a pressure higher than that of the $CO_2$ in the column.

It will be understood that the above-described extraction method is isobaric and as a rough guide, which is not to be interpreted as mandatory, it can be mentioned that:

Liquid $CO_2$ in the supply 10 can be stored at $-20°$ C. and at about 22 bar;

Pump 12 increases the pressure to something in the region of 40 to 60 bar;

The temperature maintained by the unit 15 falls within the range from $-15°$ C. to $+15°$ C;

The pressure and temperature inside the extractor column 22 are 40 to 50 bar and $-15°$ to $+15°$ C., respectively;

The temperature in the evaporator 28 is in the region of $+40°$ to $+50°$ C.; and The pressure downstream of the valve 32 and upstream of the block 34 is about 20 bar.

The apparatus shown in FIG. 1 can be used for steeping the milled hops in liquid $CO_2$ which would simply be pumped into the column 22 until it was full. At that juncture, the pump 12 would be stopped and steeping would be allowed to take place for the desired length of time. At the end of said length of time, the liquid $CO_2$ and extracted materials would be displaced by inert gas from the vessel 22 in the manner already described.

Referring now to FIG. 2, it will be apparent that the constituent components of the apparatus used to extract a plant material with carbon dioxide in its supercritical state are largely the same as those described above with reference to FIG. 1, with a few exceptions. Therefore, it is considered that it will suffice to describe only the exceptions in any detail, the components indicated by the same reference numerals as are used in FIG. 1 being the same as described with reference to FIG. 1.

The downstream side of the valve 13 is connected to an evaporator 50 in which the liquid $CO_2$ drawn from the supply 10 is gasified. Consequently, $CO_2$ in its supercritical state is fed to the top or to the bottom of the extractor column 22.

The piping 27 has connected therein a pressure-reducing controller 51 and, downstream of said controller 51, the piping 27 is connected to a separator 52. The piping 31 connects the upper end of the separator 52 to, for example, a liquefaction apparatus of any known kind indicated by the block 34 if the gases are to be recovered for re-use, or a free end of said piping 31 may be suitably located to permit venting of the gases to atmosphere if gas-recovery is not required.

The pressure downstream of the pump 12 may be up to 300 bar. It follows, therefore, that the pressure in the extractor column 22 will also be up to 300 bar. Downstream of the pressure-reducing controller 51, the pressure will be below 60 bar. These pressures, however, are given for guidance only and are not to be interpreted as being mandatory.

From the above description of FIG. 2, of which the detailed operation is the same mutatis mutandis as that already described with reference to FIG. 1, it will be understood that there are two circuit portions in one of which there is a high pressure (namely, in the evaporator and in the extractor column) and in the other of which there is a lower pressure (namely, in the separator and in the liquefaction apparatus).

In the case of both apparatuses, accumulated extract can be drawn from the evaporator 28 (FIG. 1) or from the separator 52 (FIG. 2) into the receptacle 30 whenever desired.

In the case of the FIG. 2 apparatus, all vessels and piping will be adequately provided with thermal insulation. Moreover, said vessels and piping will be made of the material(s) already mentioned above but, because they will be required to withstand significantly higher pressures, it will be necessary for them to have appropriate wall-thicknesses.

It has been found that some important advantages are obtained by the use of the methods according to the present invention, particularly when those methods have been applied to the extraction of hops:

(1) The partly extracted milled hops in the extractor column 22 are dry and powdery after the carbon dioxide has been displaced and this means that it is an easy task to empty the column.

(2) The solution (which is in the extractor column 22 when the passage of said carbon dioxide is stopped or when the steeping time has ended is removed, in its entirety, to the evaporator 28 or separator 52 in which all of the valuable extract, rich in hop oil and/or in any other fraction, is recovered instead of being lost.

(3) The step of purging by means of an inert gas or by a mixture of inert gases can be carried out as often as desired; the dry powdery milled hops left at the end of the venting step are easily pelleted, this being in marked contrast with the sticky mass of milled hops which resulted, in the previously known method(s), from allowing evaporation of the solution which was in the pressure valve when carbon dioxide passage was stopped. That sticky mass is neither easy to remove from the vessel nor easy to pelletize.

(4) The walls of the extractor column 22, the surfaces of the filters 25, 26, the inner surfaces of the piping 19, 23, 24, 27, the various valves 20', 21' and the pressure-reducing controller 51 (FIG. 2) are dry when the inert gas has been vented. Any cleaning thereof which may be desirable can be minimal and this, again, is in marked contrast with the amount of cleaning which is essential once the dissolved components of the extract have been deposited (due to evaporation of the carbon dioxide) upon everything.

(5) When displacing the carbon dioxide with the inert gas or gases, there is more precise control over the amount of solvent used to extract the components; this is so because (when passing carbon dioxide through the pressure vessel) no more solvent is passed after the instant of interruption or stoppage, and, moreover, all of the solvent used up to that instant is recovered and passed to the evaporator or separator.

In the appended claims, any reference to "an inert gas" is intended to cover a single inert gas (e.g. nitrogen) or a mixture of inert gases.

We claim:

1. A method of extracting hops in order to obtain at least fractions of its essential oil and resin components, said method comprising the following steps, namely,
   (a) admixing carbon dioxide in either the liquid or the supercritical state thereof with hops in a pressure vessel at a temperature and pressure such as to maintain said carbon dioxide in the liquid or supercritical state for a period of time in order to effect said extraction;
   (b) displacing said carbon dioxide with an inert gas which remains in the gas phase under the extraction conditions; and
   (c) venting said inert gas from said pressure vessel.

2. A method as claimed in claim 1, wherein, in step (a), said hops are steeped in liquid carbon dioxide in said pressure vessel for said period of time.

3. A method as claimed in claim 1, wherein said hops are in powdered or pelletized form.

4. A method as claimed in claim 3, wherein the method is carried into effect by
   (a) passing said carbon dioxide for said period of time through said pressure vessel in which said hops in powdered or pelletized form have been packed;
   (b) stopping said passage of carbon dioxide at the end of said period of time;
   (c) pumping said inert gas into said pressure vessel until all or substantially all of said carbon dioxide has been displaced; and
   (d) venting said inert gas from said pressure vessel.

5. A method as claimed in claim 1, wherein said inert gas is vented to atmosphere.

6. A method as claimed in claim 1, wherein said inert gas, after having been vented from said pressure vessel, is recovered for reuse.

7. A method as claimed in claim 1, wherein said inert gas is nitrogen.

8. A method as claimed in claim 1, wherein said inert gas is constituted by a mixture of inert gases.

9. A method of extracting hops in order to obtain at least fractions of its essential oil and resin components, said method comprising the following steps, namely,
   (a) admixing carbon dioxide with milled hops in a pressure vessel at a pressure in the range of 40 to 50 bar and a temperature of $-15°$ C. to $+15°$ C., for a period of time such as to provide a desired degree of extraction;
   (b) at the end of said period of time, displacing said carbon dioxide with an inert gas which remains in the gas phase under the extraction conditions; and
   (c) venting said inert gas from said pressure vessel.

* * * * *